Oct. 25, 1938.   S. H. CALDWELL   2,134,028
ELECTRIC SHOCK SPEED WARNING
Filed Oct. 5, 1936
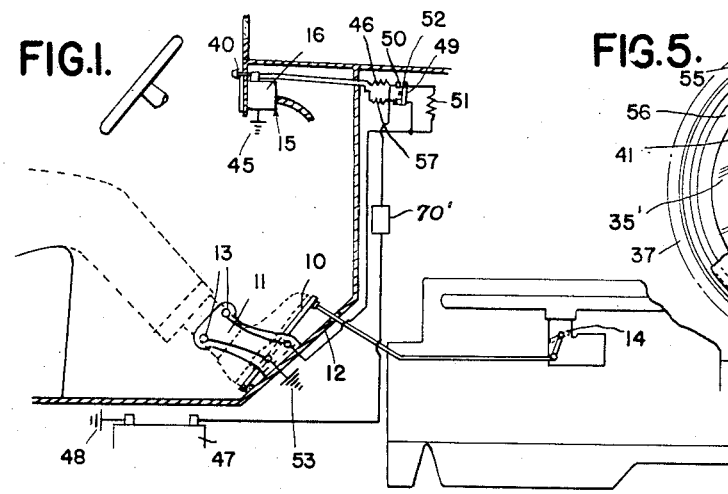
FIG. 1.
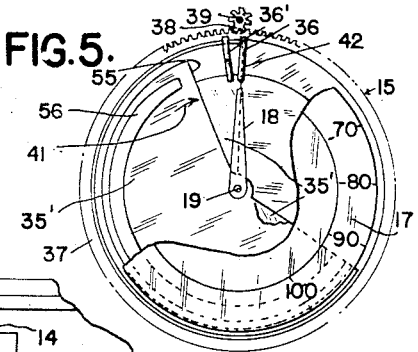
FIG. 5.
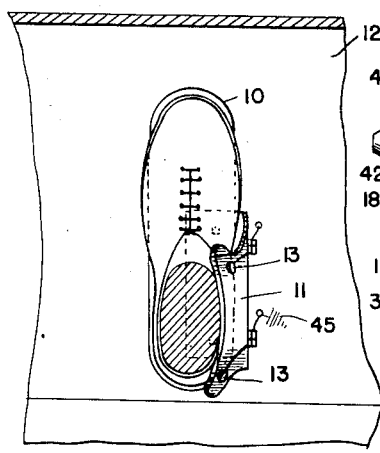
FIG. 3.
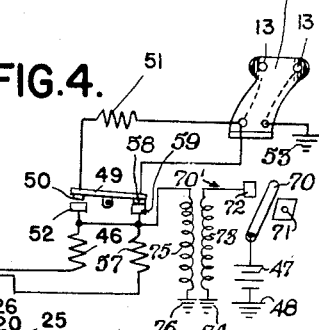
FIG. 4.
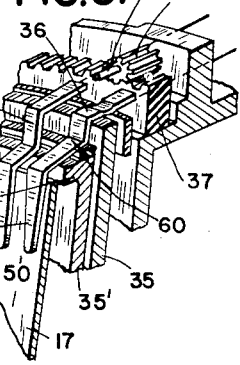
FIG. 6.
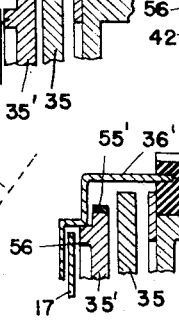
FIG. 7.
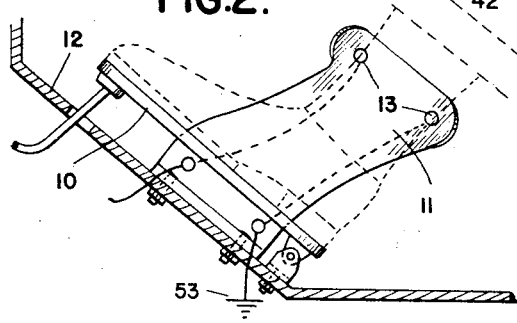
FIG. 2.
FIG. 8.
INVENTOR
STUART H. CALDWELL
BY Whittemore Hulbert & Belknap
ATTORNEYS Patented Oct. 25, 1938

2,134,028

UNITED STATES PATENT OFFICE 2,134,028

ELECTRIC SHOCK SPEED WARNING

Stuart H. Caldwell, Detroit, Mich., assignor to Kelch Heater Company, Detroit, Mich., a corporation of Michigan Application October 5, 1936, Serial No. 104,108

8 Claims. (Cl. 177—329)

This invention relates generally to motor vehicles and refers more particularly to means for indicating to the operator when the rate of travel of the vehicle exceeds a pre-selected speed.

One of the principal objects of the present invention consists in the provision of means effective when the vehicle exceeds a pre-selected rate of travel to impart a tactual signal to a part of the anatomy of the operator indicating that the desired speed is being exceeded. In accordance with this invention, the tactual signal merely serves as a warning to the operator that he has exceeded the speed selected by him and in no way restricts, or otherwise interferes, with the actuation of the throttle to operate the vehicle throughout its available speed range.

Another advantageous feature of the present invention resides in the provision of an electrically operated signal embodying means for imparting a shock to the operator of sufficient intensity to warn him that the pre-selected speed is being exceeded, but insufficient to startle the operator and cause him to become panicky.

A further object of the present invention resides in the provision of a construction wherein the tactual signal is imparted to the operator throughout the entire speed range from the particular speed selected by the operator and wherein the intensity of the tactual signal is increased in the event the operator fails to heed the warning.

In addition to the foregoing, the present invention contemplates a relatively inexpensive signal capable of being readily applied to motor vehicles of standard design without altering the construction of the latter.

The foregoing, as well as other objects, will be made more apparent as this description proceeds, especially when considered in connection with the accompanying drawing, wherein:—

Figure 1 is a diagrammatic view of a portion of a vehicle equipped with a warning device constructed in accordance with this invention;

Figure 2 is an enlarged sectional view of a portion of the construction shown in Figure 1;

Figure 3 is a plan view of the construction shown in Figure 2;

Figure 4 is a diagrammatic view of the actuating means for the warning signal;

Figure 5 is a front elevational view of the speed indicator with certain parts broken away for the sake of clearness;

Figure 6 is a fragmentary perspective view of a portion of the warning equipment;

Figure 7 is a detailed sectional view of another portion of the warning device; and Figure 8 is another detailed sectional view.

In accordance with the present invention, a tactual signal in the form of an electric shock is imparted to the leg of the operator employed to actuate the accelerator of the vehicle when the latter exceeds a pre-selected speed. The signal functions to impart a shock to the operator throughout the available range of speed from the one pre-selected and actually increases the intensity of the shock when the speed of the vehicle substantially exceeds the one selected. In neither case, however, is the shock sufficient to startle the operator to such an extent as to cause confusion.

The above mentioned tactual signal is imparted to the ankle of the foot of the operator engaged with the accelerator pedal 10 and comprises a plate 11 secured to the toeboard 12 of the vehicle body adjacent the accelerator pedal. The upper end of the plate is shaped to conform to the ankle of the operator and is so positioned with respect to the accelerator pedal 10 as to automatically engage the ankle when the corresponding foot of the operator is engaged with the pedal. A pair of contact buttons 13 are secured to the upper end of the plate and are arranged in opposite sides of an electric circuit to be bridged by the ankle of the operator. As will be more fully hereinafter set forth, when the speed of the vehicle exceeds the one pre-selected by the operator, the circuit is completed through the ankle of the operator bridging the buttons and a current of relatively small amperage is passed through the ankle, indicating to the operator that he has exceeded the desired rate of travel. It may be pointed out at this time that the accelerator pedal 10 is operatively connected to the throttle 14 regulating the flow of fuel mixture to the engine, and this connection is effected in accordance with conventional practice so that the speed of the vehicle is controlled in the usual manner from the accelerator.

The tactual signal briefly defined above is actuated by a speedometer 15 of the fly-ball governor type supported on the instrument panel of the body in a position to be readily observed by the operator. The speedometer is shown in Figure 4 as comprising a casing 16 having a dial 17 secured to the forward end of the casing in any suitable manner and having a needle 18 supported in advance of the dial for movement across the face of the same. The needle 18 is secured to the front end of a shaft 19 journalled in the front wall of the casing and having the rear end operatively connected to a fly-ball governor 20, through the medium of suitable reduction gearing 21. The governor 20 is of conventional construction having a shaft 22 journalled in opposite side walls of the casing and having collars supported on the shaft in axial spaced relationship for relative movement toward and away from each other. In the present instance, the collar 23 is secured to the shaft 22, and the opposed collar 24 is mounted on the shaft for axial sliding movement relative to the collar 23. The two collars are interconnected by means of weight carrying links 25, and the collar 24 is normally urged in a direction away from the collar 23 by means of a coil spring 26 surrounding the shaft 22 between the collars. In accordance with conventional practice, the weight carrying links are arranged in pairs having their outer ends respectively pivotally connected to the collars and having their inner ends pivotally connected together through the medium of centrifugal weights 27. The weights 27 move radially outwardly with respect to the axis of the shaft 22 in dependence upon the speed of rotation of said shaft and, as the weights are displaced outwardly by the action of centrifugal force, the collar 24 is moved against the action of the spring 20 toward the collar 23. As shown in Figure 4, the collar 24 is operatively connected to the drive gear 28 of the reduction gearing 21 by means of a crank 29 having the crank pin 30 engageable in an annular groove 31 formed in the collar 24. The arrangement is such that movement of the collar 24 axially toward the collar 23, under the influence by the weights 27, effects a swinging movement of the needle 18 over the face of the dial 17 through the medium of the crank 29 and train of gearing 21. The governor shaft 22 is rotated from a selected part of the power plant of the vehicle through the medium of a conventional speedometer drive cable 31 operatively connected to a shaft 32 journalled in the casing 16 and having a spirally toothed gear 33 secured thereto and meshing with correspondingly spiralled teeth on the governor shaft 22. Owing to the fact that the diameter of the gear 33 is substantially greater than the tooth portion of the shaft 22, it necessarily follows that the shaft 22 is rotated at a speed faster than the speed of the driving cable, and this practice is desirable in that it affords greater accuracy in indicating the speeds of the vehicle.

It has previously been stated that the tactual signal 11 is actuated by the speedometer 15, and this is accomplished herein without appreciably altering the construction of the speedometer unit. As shown in Figure 4, a contact segment 35 is secured to the indicating needle shaft 19 for rotation therewith as a unit and adapted to engage a contact clip 36 secured to a ring 37 of dielectric material rotatably mounted on the forward end of the casing 16 and having teeth on the periphery thereof adapted to mesh with a pinion 38 secured to the control shaft 39. The control shaft 39 is rotatably journalled on the casing and is provided with a control 40 positioned for convenient manipulation by the operator. The arrangement is such that manipulation of the control 40 varies the position of the contact clip 36 relative to the segment and this, of course, changes the speed at which the two contacts come into engagement with each other. In Figure 5 of the drawing, the segment is shown in a position where it has just engaged the contact clip 36, and it will be noted from this figure that the segment is so designed as to maintain this engagement throughout continued travel of the needle 18 in the direction of the arrow 41. It will be noted that the forward end of the contact clip 36 terminates in a pointer 42 adapted to overlap the dial 17 and cooperates with the indicia on the dial to guide the operator when selecting the particular speed he desires the signal to function. For example, if the operator desires to be warned when the vehicle exceeds fifty miles per hour, the contact clip is adjusted until the pointer registers with the numeral 50 on the dial 17. This locates the contact clip 36 in a position to be engaged by the leading edge of the contact segment when this edge is moved by the needle shaft 19 to a position wherein it also registers with the numeral 50. As will be presently described, engagement of the cooperating contacts closes the circuit to the signal 11 and the latter imparts a slight shock to the ankle of the operator's foot engaged with the accelerator pedal.

The contact segment 35 is grounded through the casing 16 in the manner indicated by the reference character 45, and the contact clip 36 is electrically connected to one end of a coil 46 of a suitable relay having the other end connected to a secondary 75 of an induction coil.

The secondary 75 which serves as the source of power for energizing coils 46 and 57 as well as the source of power supplying the signal means, may be as shown in Fig. 4. In this figure a battery 47, grounded at 48, is connected to a step-up transformer generally indicated at 70'. The battery 47 is connected to a movable switch arm 70 which is normally biased clockwise as seen in Fig. 4, by a spring or other means (not shown). The cam 71 which is adapted to be continuously rotated by a part of the motor, moves switch arm 70 so as to rapidly make and break a circuit between contact 72 and switch arm 70. Contact 72 is connected directly to the primary 73 and thence to ground, as indicated at 74. The secondary 75 is grounded as indicated at 76 and is connected to coils 46 and 57, the arrangement being such that the coils 46 and 57 are in parallel. It will be evident that the current applied to coils 46 and 57 will be high frequency intermittent direct current, which will serve to maintain the armature 49 in either position, according to which coil is energized. It will also be evident that the strength of this intermittent direct current will depend upon the ratio between the number of turns in the primary 73 and the secondary 75, and these will be of course selected so as to apply a signal of suitable strength to the operator of the vehicle. It will be recognized also that the step-up transformer and circuit interrupter indicated generally at 70' in Fig. 4 and also indicated in Fig. 1, is or may be, if desired, a portion of the ignition circuit, in which case the cam 71 may be in the distributor and the secondary 75 may be the secondary of the ignition circuit. For simplicity, the drawing is purely diagrammatic and circuits and connections not necessary to the present invention have been purposely omitted.

The armature 49 of the relay is pivotally supported intermediate the ends thereof and carries a contact 50 at one end electrically connected to one of the buttons 13 of the signal, through the medium of a resistance 51, and adapted to engage the contact 52 of the coil 46, when the latter is energized, to supply electrical energy to the aforesaid button 13. The other button 13 of the signal 11 is grounded, as at 53, so that both contacts must be bridged by the ankle of the operator before the circuit can be closed.

Assuming that the contact segment moves into engagement with the contact clip 36, it will be noted that a circuit is closed through the coil 46, and energization of the latter causes the contact 50 to engage the contact 52. When this is accomplished, electrical energy is supplied to the button 13 on the signal 11, and the electrical energy, passes through the ankle of the operator to the ground 53. This, of course, imparts a shock to the operator indicating that he has exceeded the pre-selected speed.

Reference has been made to the fact that the intensity of the warning signal is increased when the speed of the vehicle substantially exceeds the pre-selected speed. The foregoing is accomplished in the present instance by providing a second contact clip 36' secured to the ring 37 adjacent the clip 36 and engageable with a second segment 35' secured to the needle shaft 19 for rotation as a unit with the segment 35. It will be observed from Figure 5 that the leading edge 55 of the segment 35' is spaced from the corresponding edge of the segment 35 in a direction opposite the direction of rotation indicated by the arrow 41. As a consequence, the segment 35' contacts with the clip 36' after the clip 36 engages the segment 35 to actuate the signal 11. Just prior to engagement of the clip 36' with the contact segment 35', the insulating ring 55' on the periphery of the segment 35' engages a shoulder 60 formed on the clip 36 and disengages the latter from the segment 35 to break the circuit to the signal 11. Immediately after the clip 36 is disengaged from the segment 35 by the segment 35', an arcuate cam 56 on the front side of the latter contacts with the clip 36' in the manner shown in Figure 8, and closes a circuit to the coil 57 of a second relay. Energization of the coil 57 causes the contact 58 on the end of the armature 49 opposite the end having the contact 50, to engage the coil contact 59 and supply electrical energy to the same button 13 on the signal, previously defined as connected to the contact 50. The resistance 51 in the conductor connecting the contact 50 to this button contact is omitted in the electrical connection of the contact 58 with the signal, so that a circuit of higher amperage is passed through the operator's ankle when the circuit controlled by the segment 35' and clip 36' is closed. This, of course, serves to increase the intensity of the signal imparted the operator. In either case, however, the current is not sufficient to startle or confuse the operator.

What I claim as my invention is:

1. In a motor vehicle, means effective when a condition of the vehicle exceeds a predetermined value to pass a relatively low amperage current through a part of the anatomy of the operator of sufficient intensity to indicate that the predetermined value is being exceeded, and means for increasing the amperage as the value of the condition is increased above the pre-determined value.

2. In a motor vehicle, a pair of electrical circuits embodying spaced contacts located in a position to be bridged by a part of the anatomy of the operator during manipulation of the vehicle, one of the circuits having a resistance therein, switches respectively controlling the circuits, and means effective when the condition of the vehicle exceeds a predetermined value to successively close the switch controlling the circuit having the resistance and the switch controlling the other circuit to pass a predetermined current through a part of the anatomy of the operator to indicate that the predetermined value has been reached and at a higher value to pass an increased current through a part of the anatomy of the operator.

3. In a motor vehicle, a pair of electrical circuits embodying spaced contacts located in a position to be bridged by a part of the anatomy of the operator during manipulation of the vehicle, one of the circuits having a resistance therein, switches respectively controlling the circuits, means effective when a condition of the vehicle exceeds a predetermined value to close the switch controlling the circuit having the resistance therein, to pass a predetermined current through a part of the operator's anatomy and means effective as the value of the condition is further increased to close the switch controlling the other circuit to pass an increased current through a part of the operator's anatomy.

4. In a motor vehicle, a pair of electrical circuits embodying spaced contacts located in a position to be bridged by a part of the anatomy of the operator during manipulation of the vehicle, one of the circuits having a resistance therein, switches respectively controlling the circuits, means effective when a condition of the vehicle exceeds a predetermined value to close the switch controlling the circuit having the resistance therein to pass a predetermined current through a part of the operator's anatomy, means effective as the value of the condition is further increased to close the switch controlling the other circuit to pass an increased current through a part of the operator's anatomy, and means under the control of the operator for pre-selecting the value of the condition at which the switch controlling the circuit having the resistance is closed.

5. A condition signaling apparatus, a member controlling said condition, a plate secured adjacent one side of said member and extending upwardly, said plate adapted to engage an operator, spaced contacts on said plate, a first and second parallel circuit, each including said contacts, a resistance in said first mentioned circuit, condition responsive means adapted to close said first circuit when said condition attains a predetermined value to warn said operator by electrical shock that said predetermined value has been reached, and to close said second circuit when said condition attains a second predetermined value higher than said first mentioned predetermined value to warn said operator by increased electrical shock that said second predetermined value has been reached.

6. In condition responsive signaling mechanism in a motor vehicle, a control member, a plate secured adjacent to one side of said member, spaced contacts on said plate in a position to engage the operator, a circuit including said contacts, condition responsive means and a switch controlled by said means to close the circuit to said contacts when said condition is above a predetermined value.

7. In condition responsive signaling mechanism in a motor vehicle, a control member, a plate secured adjacent said member, spaced contacts on said plate in a position to engage the operator, a first and second parallel circuit, each including said contacts, said first circuit including a resistance therein, condition responsive means adapted to close said first circuit when said condition is above a predetermined value to signal the operator by a definite electrical shock, and to close said second circuit when said condition is above a second predetermined value greater than said first mentioned value to signal the operator by an increased electrical shock.

8. In a motor vehicle, a control member for said vehicle, tactual signal means adjacent said control member, means effective when a condition of the vehicle exceeds a predetermined value to operate said tactual signal means at a constant intensity, and means effective when said condition exceeds a second predetermined value higher than said first predetermined value to operate said signal means at an increased constant intensity.

STUART H. CALDWELL.